R. G. HARRIER.
DRIVING MECHANISM.
APPLICATION FILED JUNE 9, 1916.
1,219,553.
Patented Mar. 20, 1917.
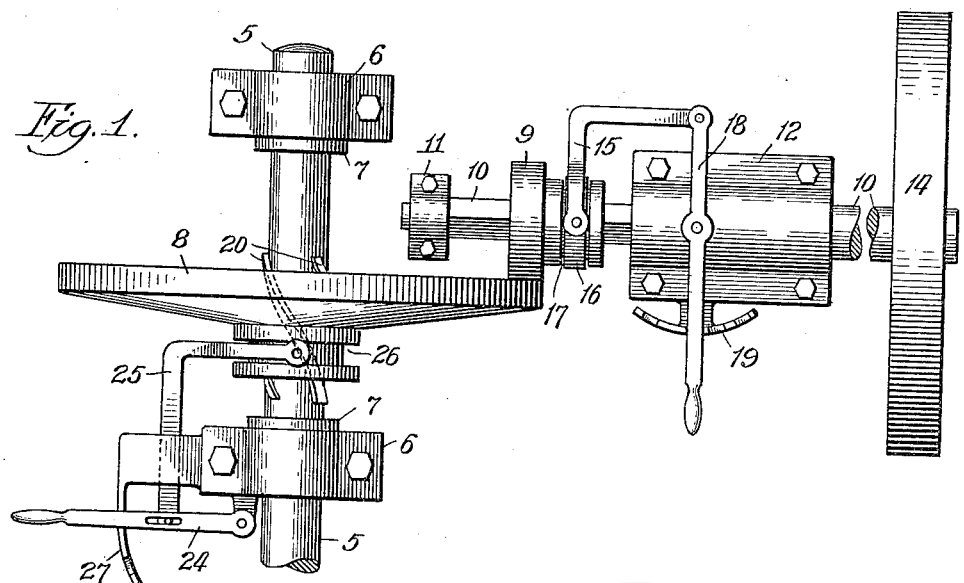
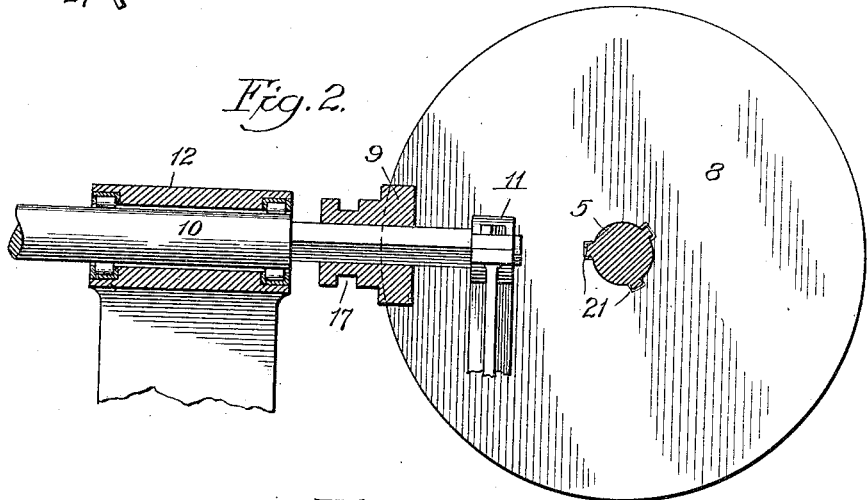
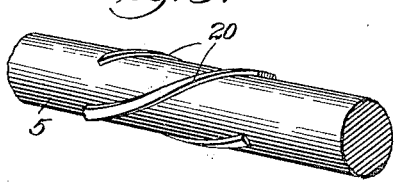
Witness:
John Enders
Inventor:
Richard G. Harrier
by Fred Gerlach
his Atty.

UNITED STATES PATENT OFFICE.

RICHARD G. HARRIER, OF NORTH BEND, NEBRASKA.

DRIVING MECHANISM.

1,219,553.  Specification of Letters Patent.  Patented Mar. 20, 1917.

Application filed June 9, 1916.  Serial No. 102,639.

*To all whom it may concern:*

Be it known that I, RICHARD G. HARRIER, a citizen of the United States, and a resident of North Bend, in the county of Dodge and State of Nebraska, have invented certain new and useful Improvements in Driving Mechanism, of which the following is a full, clear, and exact description.

The invention relates to friction driving mechanism.

One object of the invention is to provide improved friction driving mechanism in which provision is made for automatically retaining the driving faces of the wheels in driving contact.

Another object of the invention is to provide friction drive mechanism which is simple in construction and efficient in operation.

In the drawings: Figure 1 is a plan of mechanism exemplifying the invention. Fig. 2 is a section taken on line 2—2 of Fig. 1. Fig. 3 is a perspective of the drive shaft and keys thereon.

In the exemplification of the invention illustrated, 5 denotes the drive shaft to which power may be communicated in any suitable manner. This shaft is mounted in fixed bearings 6 and is held against longitudinal movement in the bearings by any suitable means, such as collars 7 fixed to the shaft inside of said bearings. A driving-wheel or disk 8 is mounted on the shaft 5 and one of its faces is adapted to drive a friction-pulley 9 which is mounted on a shaft 10 which is mounted in bearings 11 and 12. The shaft 10 exemplifies the driven shaft and may be provided with a pulley 14 for communicating power to some part to be driven. Pulley 9 is slidably mounted on a square portion of shaft 10 so that it may be shifted to and from the axis of the disk 8 to vary the speed at which shaft 10 will be driven. A fork 15 suitably connected to a collar 16 in a groove 17 of the hub of wheel 9 is adapted to shift the pulley 9 on shaft 10 and a lever 18 is provided for shifting the fork. A suitable rack 19 serves to lock lever 18 in assigned position to hold the pulley 9 in desired position.

Wheel 8 is connected to the drive shaft 5 by a series of helical ribs 20 which are fixed on said shaft and slidably fit in correspondingly shaped grooves in the hub of said wheel. These ribs 20 are curved relatively to the axis of or in such a direction that when the shaft 5 is driven, these ribs acting on the central portion of the disk wheel 8 through grooves 21, will crowd said wheel toward the periphery of the driven wheel 9 and as a result the disk wheel will be forced automatically or by power against the driven wheel, thus producing efficient frictional engagement between the driving wheel and the driven wheel. To shift the drive wheel 8 into and out of operative relation to the driven wheel, a lever 24 is suitably connected to a slidable fork 25 which is suitably connected to a groove 26 in the hub of wheel 8 and a suitable rack serves to hold lever 24 in assigned position.

The invention exemplifies friction driving mechanism in which there is connection between the drive shaft and the drive wheel which causes the wheel to be automatically forced into frictional engagement with the driven wheel when the driven wheel is to be operated. By opening lever 24, the wheel 8 may be disconnected from the driven wheel 9. Lever 24 and fork 25 serve as a throw-off for the drive wheel. Lever 18 and fork 15 serve to adjust the driven wheel 9 across the face of the driving wheel 8 to vary the speed at which shaft 10 will be driven.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In driving mechanism, the combination of a drive-shaft, a friction drive wheel on said drive shaft, a driven shaft, a friction wheel on said driven shaft and mounted for engagement by said drive wheel, and a helical rib and groove driving connection between one of said shafts and one of said wheels, composed of elements rigid with the connected shaft and wheel respectively, whereby the wheels will be forced into operative contact by power applied to said connection.

2. In driving mechanism, the combination of a drive shaft, a friction drive wheel on said drive shaft, a driven shaft, a friction wheel on said driven shaft mounted for frictional engagement by said drive wheel, and a helical rib and groove driving connection composed of elements rigid with the drive wheel and its shaft, respectively, whereby the drive wheel will be forced into operative contact with the driven wheel by power applied to the connection.

RICHARD G. HARRIER.

Copies of this patent may be obtained for five cents each, by addressing the "Commissioner of Patents, Washington, D. C."